United States Patent

Takagi

[19]

[11] Patent Number: 5,907,826
[45] Date of Patent: May 25, 1999

[54] SPEAKER-INDEPENDENT SPEECH RECOGNITION USING VOWEL/CONSONANT SEGMENTATION BASED ON PITCH INTENSITY VALUES

[75] Inventor: Keizaburo Takagi, Tokyo, Japan

[73] Assignee: NEC Corporation, Tokyo, Japan

[21] Appl. No.: 08/959,464

[22] Filed: Oct. 28, 1997

[30] Foreign Application Priority Data

Oct. 28, 1996 [JP] Japan ................................. 8-284827

[51] Int. Cl.$^6$ ................................ G10L 3/02; G10L 9/00
[52] U.S. Cl. ........................ 704/251; 704/208; 704/256
[58] Field of Search ................................... 704/208, 251, 704/256

[56] References Cited

U.S. PATENT DOCUMENTS

| | | | |
|---|---|---|---|
| 4,667,340 | 5/1987 | Arjmand et al. | 704/207 |
| 5,406,635 | 4/1995 | Jarvinen | 704/226 |
| 5,657,418 | 8/1997 | Gerson et al. | 704/207 |
| 5,812,970 | 9/1998 | Chan et al. | 704/226 |

FOREIGN PATENT DOCUMENTS

| | | | |
|---|---|---|---|
| 0 459 382 | 12/1991 | European Pat. Off. | G10L 3/02 |
| 0 674 307 | 9/1995 | European Pat. Off. | G10L 9/00 |
| 8-076789 | 3/1996 | Japan | G10L 3/00 |

OTHER PUBLICATIONS

Article "Isolated Word Recognition Using Pitch Pattern Information", IEICE Trans. Fundamentals vol. E76–A, No. 2, Feb. 1,1993, pp. 231–236.

Rabiner et al., "Digital Signal Processing for Speech" *Corona* 2:73–75 (1988).

Rabiner et al., "Digital Signal Processing for Speech" *Corona* 2:135–140 (1988).

*Primary Examiner*—David R. Hudspeth
*Assistant Examiner*—T. Smits
*Attorney, Agent, or Firm*—Foley & Lardner

[57] ABSTRACT

A speech recognition apparatus includes a feature extraction section, and a recognition section. The feature extraction section extracts the feature vectors of input speech. The feature extraction section includes at least a pitch intensity extraction section. The pitch intensity extraction section extracts the intensities of the fundamental frequency components of the input speech. The recognition section performs speech recognition by using the feature vectors from the feature extraction section.

11 Claims, 2 Drawing Sheets

SPEAKER-INDEPENDENT SPEECH RECOGNITION USING VOWEL/CONSONANT SEGMENTATION BASED ON PITCH INTENSITY VALUES

BACKGROUND OF THE INVENTION

The present invention relates to a speech recognition apparatus and, more particularly, to a speech recognition technique using the intensity information of fundamental frequency components.

In speech recognition techniques, the most popular scheme is a scheme of converting input speech into a feature vector by analyzing the waveform of input speech within an analysis window (frame), which moves at predetermined time intervals, for a short period of time, and handling the entire input speech as a time series signal representing the feature vector, thereby performing matching. Various analysis schemes for this feature vector have bee proposed. Although not all of them can be described here, they include cepstrum analysis, spectrum analysis, power analysis, and the like.

A conventional scheme of using fundamental frequency (to be referred to as "pitch" hereinafter) information as part of a feature vector has been used to improve the speech recognition performance. This scheme has an arrangement like the one shown in FIG. 4. More specifically, a feature extraction section 41 converts input speech into feature vectors (e.g., a cepstrum or the like) which have been used for general speech recognition. A pitch extraction section 42 converts the input speech into pitch frequencies or the time derivatives thereof, which are output as feature vectors for recognition to a recognition section 43, together with the feature vectors output from the feature extraction section 41. The recognition section 43 performs matching between the feature vectors output from the feature extraction section 41 and the pitch extraction section 42 and the standard patterns analyzed by the same feature vector configuration in advance, and outputs the most likelihood vector as the recognition result.

A speech recognition apparatus of this type is designed to avoid vowel/consonant (voiced sound/unvoiced sound) segmentation errors in matching by including pitch information as part of a feature vector, thereby realizing high performance. Vowels of speech are generated when the vocal tract is driven by a pulse-like sound source generated by opening/closing of the glottis. The vowels therefore have clear periodic structures and are observed as pitches.

In contrast to this, consonants (especially unvoiced consonants) are generated by an aperiodic sound source other than the glottis. The consonants do not therefore have clear periodic structure, and no clear pitches are observed. For these reasons, errors in matching between vowel and consonant portions can be reduced by using pitch information.

It is another purpose of a speech recognition apparatus of a type to identify the pitch pattern of a tonal language such as Chinese. However, since this purpose differs from the objects of the present invention, a detailed description thereof will be omitted.

In a conventional speech recognition apparatus using pitch information, frequency information about pitches is directly used or used as the time derivatives of frequency information. When frequency information about pitches is directly used, the information greatly varies among individuals as well as sex. In addition, the frequency information obtained from a given individual is easily influenced by his/her physical condition and a psychological factor, and hence is unstable. That is, such information disturbs the speech recognition apparatus and cannot be an effective parameter. Since this information greatly varies among individuals, in particular, the information is a feature vector unsuited for a parameter for unspecific speaker speech recognition.

In a speech recognition apparatus using the time derivatives of pitch frequency information, such information greatly varies among individuals and areas. For example, even the same contents of an utterance greatly vary in pitch among dialects and the like. This tendency directly reflects in the time derivatives of pitch frequency information. This information therefore becomes a parameter that greatly varies among individuals and areas. That is, this parameter is not useful for unspecific speaker speech recognition.

SUMMARY OF THE INVENTION

It is an object of the present invention to provide a speech recognition apparatus which forms feature vectors suited for a speaker-independent speech recognition apparatus by using pitch intensity information free from variations among individuals and areas and the time derivatives of pitch intensity information, instead of pitch frequency information susceptible to the adverse influence of variations among individuals and areas.

It is another object of the present invention to provide a high-performance speech recognition apparatus which reduces voiced sound/unvoiced sound (vowel/consonant) segmentation errors.

In order to achieve the above objects, according to the present invention, there is provided a speech recognition apparatus comprising feature extraction means for extracting feature vectors of input speech, the feature extraction means including at least pitch intensity extraction means for extracting intensities of fundamental frequency components of the input speech;, and recognition means for performing speech recognition by using the feature vectors from the feature extraction means.

DETAILED DESCRIPTION OF THE PREFERRED EMBODIMENTS

The embodiments of the present invention will be described in detail below with reference to the accompanying drawings.

Figure 1:
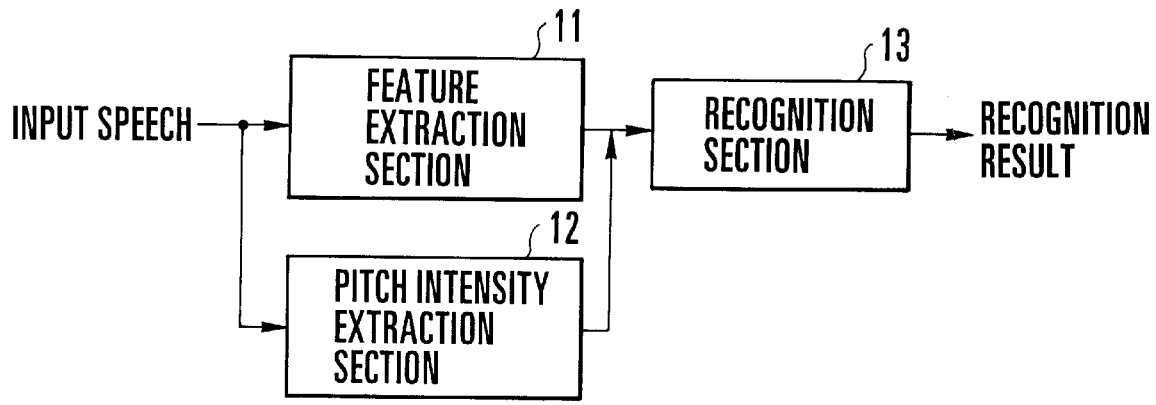
FIG. 1 is a block diagram showing a speech recognition apparatus according to the first embodiment of the present invention.

FIG. 1 shows a speech recognition apparatus according to the first embodiment of the present invention. This speech recognition apparatus includes a feature extraction section 11 for extracting the feature vectors of input speech, a pitch intensity extraction section 12 for extracting the intensities of the fundamental frequency components of the input speech, and a recognition by suing the feature vectors from the feature extraction section 11 when some or all of the feature vector from the feature extraction section 11 match the pitch intensities extracted by the pitch intensity extraction section 12. When feature vectors are to be formed by using both the pitch intensities output from the pitch intensity extraction section 12 and other feature vectors for speech recognition, the feature extraction section 11 outputs these other feature vectors for speech recognition.

The pitch intensity extraction section 12 converts input speech into pitch intensities. Various pitch extraction techniques of extracting pitch intensities have been proposed. The pitch intensity is extracted by using one of the techniques. For example, this pitch extraction technique can use the intensity of the pitch component of a harmonic product spectrum or its logarithmic intensity described in L. R. Rabinar, R. W. Schafer, "Digital Signal Processing for Speech", Corona, Volume 2, pp. 73–75, 1988, the intensity of a cepstrum at its peak position described in L. R. Rabinar, R. W. Schafer, "Digital Signal Processing for Speech", Corona, Volume 2, pp. 135–140, 1988, or the intensity of an cepstrum coefficient at its pitch position or its logarithm.

The recognition section 13 performs speech recognition by using the pitch intensities extracted by the pitch intensity extraction section 12 and other feature vectors extracted by the feature extraction section 11 for speech recognition. Various types of vectors are known as feature vectors used for speech recognition. Although not all of them can be described, a cepstrum, a spectrum, a power spectrum, the time derivatives thereof, and the like are available as typical examples. Any other types of feature vectors can be used as long as they can be used for speech recognition.

Various speech recognition algorithms have also been known. Although not all of them can be described, a DP matching algorithm, an HMM algorithm, a neural network algorithm, and the like are available as typical examples. Any other types of methods can be used as long as they are designed to perform recognition processing for speech recognition.

Figure 2:
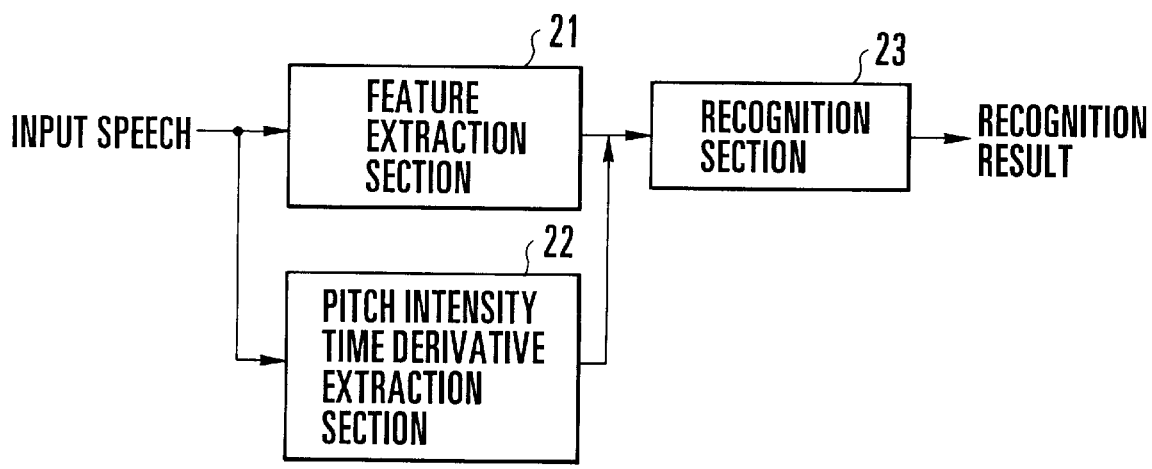
FIG. 2 is a block diagram showing a speech recognition apparatus according to the second embodiment of the present invention.

FIG. 2 shows a speech recognition apparatus according to the second embodiment of the present invention. This speech recognition apparatus includes a feature extraction section 21 for extracting the feature vectors of input speech, a pitch intensity time derivative extraction section 22 for extracting the time derivatives of the intensities of the fundamental frequency components of the input speech, and a recognition section 23 for performing speech recognition by using the feature vectors from the feature extraction section 21 when some or all of the feature vectors from the feature extraction section 21 match the time derivatives of the pitch intensities extracted by the pitch intensity time derivative extraction section 22.

When the pitch intensities output from the pitch intensity time derivative extraction section 22 and other feature vectors for speech recognition are used as feature vectors, the feature extraction section 21 outputs these other feature vectors for speech recognition.

The pitch intensity time derivative extraction section 22 converts the input speech into pitch intensity time derivatives. Various types of schemes have been known as algorithms for obtaining time derivatives as well as pitch intensities. Letting P(t) be the pitch intensity, time derivative ΔP(t) using a linear regression coefficient are calculated from equation (1) below:

$$\Delta P(t) = \frac{\sum_{j=-M}^{M} jP(t+j)}{\sum_{j=-M}^{M} j^2} \quad (1)$$

where M is the regression window width of interest. Any other types of amount information can be used as long as they represent amounts (dynamic feature amounts) indicating changes over time. In addition, nth-degree time derivatives can be obtained and used by applying an equation for obtaining a dynamic feature an arbitrary number n of times. When pitch time derivatives are used, the time derivatives are small at a portion having a stable pitch intensity, whereas the time derivatives are large at a portion having a variable pitch intensity. For this reason, the value increases at the boundary between a voiced sound and an unvoiced sound, or the boundary portion where a shift from an unvoiced sound to a voiced sound occurs. As a result, segmentation errors at these portions are reduced, and hence this type of amount information is an effective parameter for speech recognition.

Figure 3:
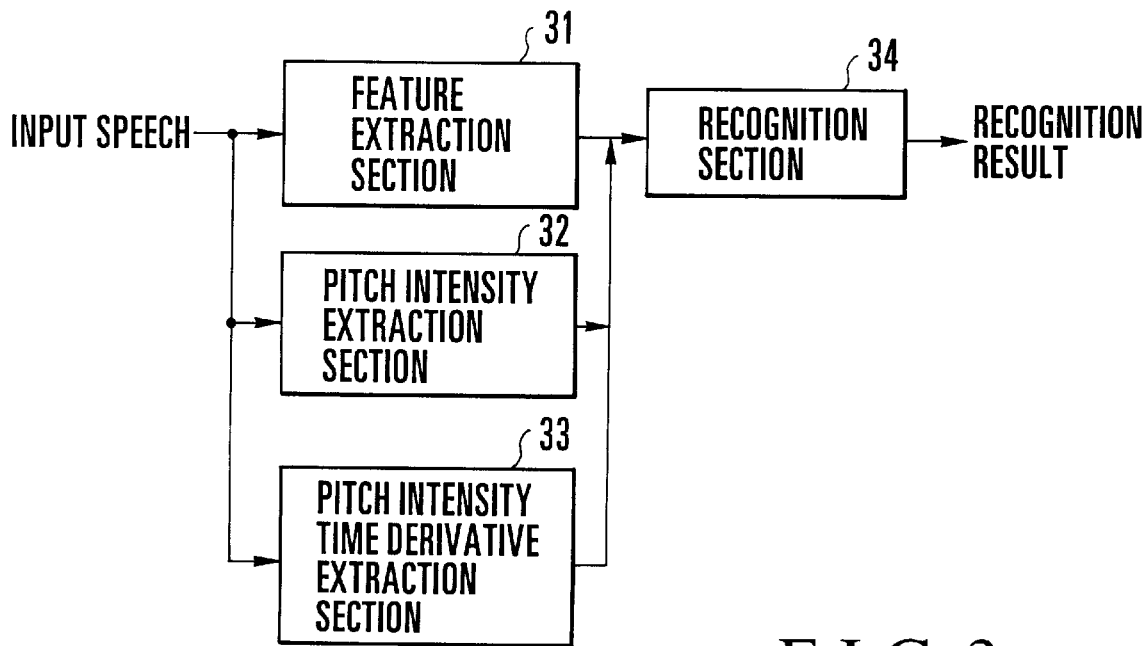
FIG. 3 is a block diagram showing a speech recognition apparatus according to the third embodiment of the present invention.
Figure 4:
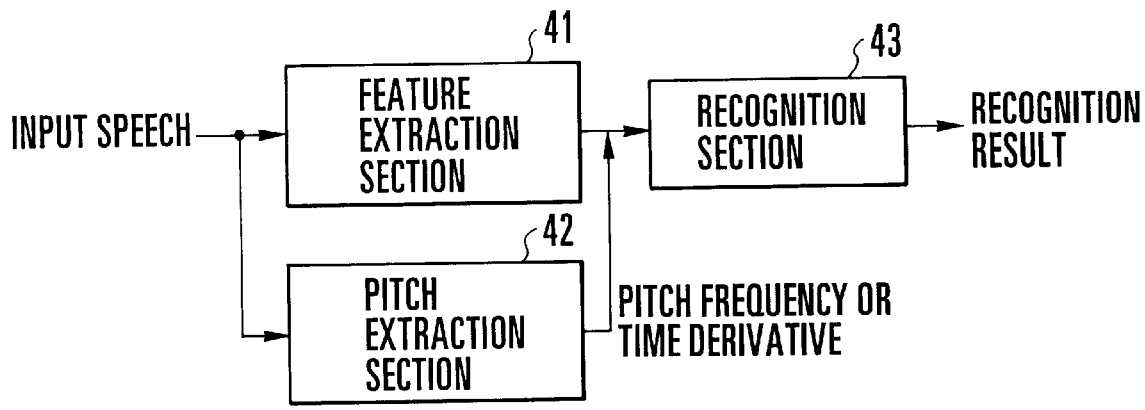
FIG. 4 is a block diagram showing a conventional speech recognition apparatus.

FIG. 3 shows a speech recognition apparatus according to the third embodiment of the present invention. This speech recognition apparatus includes a feature extraction section 31 for extracting the feature vectors of input speech, a pitch intensity extraction section 32 for extracting the intensities of the fundamental frequency components of the input speech, a pitch intensity time derivative extraction section 33 for extracting the time derivatives of the intensities of the fundamental frequency components of the input speech, and a recognition section 34 for performing speech recognition by using the feature vectors from the feature extraction section 31 when some or all of the feature vectors from the feature extraction section 31 match the pitch intensities extracted by the pitch intensity extraction section 32 and the pitch intensity time derivatives extracted by the pitch intensity time derivative extraction section 33.

When the pitch intensities and the pitch intensity time derivatives output from the pitch intensity extraction section 32 and the pitch intensity time derivative extraction section 33 and other feature vector for speech recognition are used as feature vectors, the feature extraction section 31 outputs these other feature vectors for speech recognition.

The pitch intensity extraction section 32 converts input speech into pitch intensities. At the same time, the pitch intensity time derivative extraction section 33 converts the input speech into pitch intensity time derivatives. The recognition section 34 performs speech recognition on the basis of the outputs from the pitch intensity extraction section 32 and the pitch intensity time derivative extraction section 33. When the pitch intensities used in the pitch intensity time derivative extraction section 33 are obtained by the same calculation method as that for the pitch intensities extracted by the pitch intensity extraction section 32, the pitch intensity time derivative extraction section 33 can be constituted by using the outputs from the pitch intensity extraction section 32.

Figure 5:
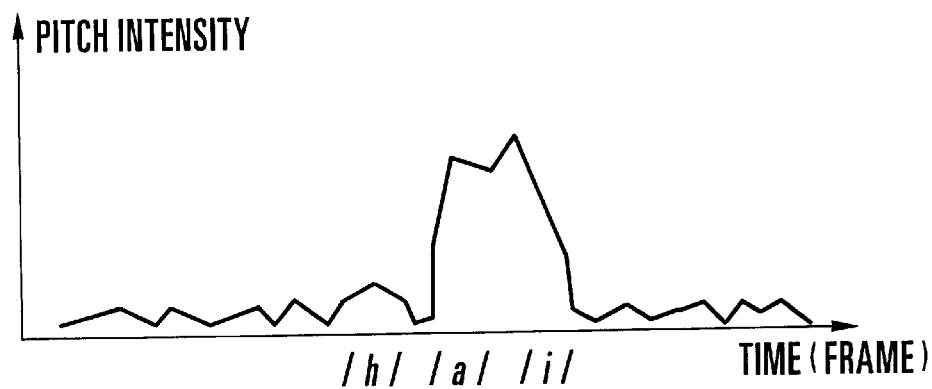
FIG. 5 is a graph showing the pitch intensities used in the speech recognition apparatus of the present invention.

FIG. 5 shows an example of how the pitch intensity of an utterance, e.g., "hai", which is used in the speech recognition apparatus of the present invention, changes over time. The utterance "hai" is constituted by the unvoiced consonant "h", the vowel "a", and the vowel "i". The pitch intensity becomes low at "h" and a time position where no sound is present because no clear pitch can be observed. In contrast to this, clear pitches are observed at the vowels "a" and "i", and high pitch intensities are obtained. For this reason, pitch intensity information is a good parameter for indicating a voiced portion such as a vowel, and hence can be used as a good feature vector for speech recognition.

Figure 6:
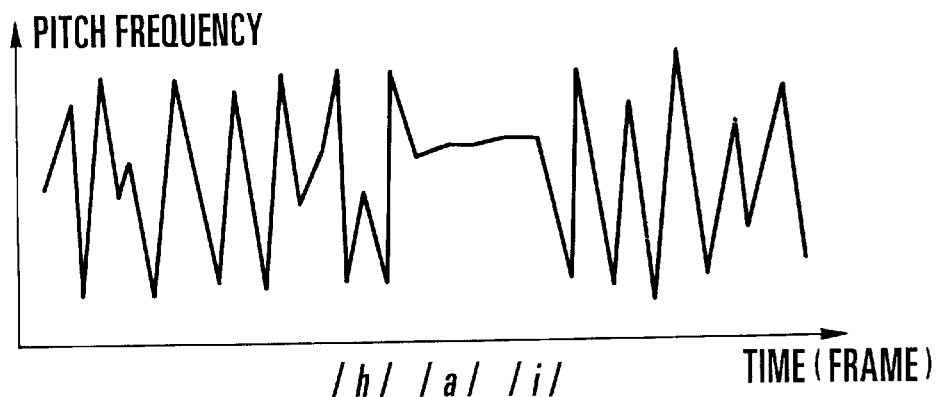
FIG. 6 is a graph showing the pitch frequencies used in the conventional speech recognition apparatus.

FIG. 6 shows an example of how the pitch frequency information of the same utterance "hai" as that described above, which is used in the conventional speech recognition apparatus, changes over time. Referring to FIG. 6, there are many portions, e.g., portions other than the utterance and the unvoiced consonant "h", at which no clear pitch is observed. At these portions, the extracted pitch frequencies often exhibit random shapes and are not stable. That is, only the portions corresponding to "a" and "i" are the reliable portions in FIG. 6, but the remaining portions are unnecessary. For example, to solve this problem, only the reliable interval may be extracted by using a threshold determination logic using pitch intensity information. However, such determination includes errors, and the overall reliability of pitch frequency information deteriorated due to the errors. Furthermore, the frequency information about the portions "a" and "i", from which pitch frequencies are accurately extracted, themselves greatly vary among individuals. The use of such values as feature vectors for speech recognition only disturbs the operation of the speech recognition apparatus, but does not contribute to an improvement in performance.

As described above, a pitch intensity in the present invention essentially represents the magnitude of a pitch degree (indicating how many pitches are present) as a continuous value. Since noise and unvoiced sounds take small values, and voiced sounds take large values, pitch intensity information is free from unstable behavior and hence is stable.

In addition, a pitch intensity is less susceptible to individual variations than a pitch frequency. For this reason, pitch intensity information exhibits high performance in speech recognition for unspecific speaker. Furthermore, since no threshold determination is required unlike the conventional technique using a pitch frequency, no deterioration in reliability occurs.

Modifications of the first to third embodiments will be described below.

In the first modification, when a cepstrum is used as a pitch intensity, the maximum value of a quefrency component having the maximum value of the cepstrum can be directly used as the pitch intensity. Note that a quefrency range in which a maximum value search is to be performed may be defined in advance.

In the second modification, when an cepstrum coefficient is to be used, the maximum value of the cepstrum coefficient or its logarithm can be directly used as a pitch intensity. Note that an cepstrum coefficient range in which a maximum value search is to be performed may be defined in advance.

A case in which when a cepstrum is to be used as a pitch intensity, the maximum value is obtained after two-dimensional patterns in the frame direction and the quefrency direction are processed by a two-dimensional filter for peak emphasis will be described as the third modification. For example, a Gaussian filter can be used as the two-dimensional filter implementing this function. Consider, for example, a case in which a filter D with 3×3 orders as indicated by equation (2):

$$D = \begin{vmatrix} \sqrt{2} & 1 & \sqrt{2} \\ 1 & 4+4\sqrt{2} & 1 \\ \sqrt{2} & 1 & \sqrt{2} \end{vmatrix}$$

Letting $C(i, j)$ (i: time axis direction, j: quefrency direction) be the two-dimensional cepstrum, a cepstrum $X(i, j)$ for which peak emphasis processing is performed by using the filter D is calculated from equation (3) given below:

$$X(i, j) = \{\sqrt{2}\, C(i-1, j-1) + C(i-1, j) + C(i, j-1) + \quad (3)$$
$$\sqrt{2}\, C(i-1, j+1) + C(i, j-1) + (4+4\sqrt{2})C(i, j) +$$
$$C(i, j+1) + \sqrt{2}\, C(i+1, j-1) + C(i+1, j) +$$
$$\sqrt{2}\, C(i+1, j+1)\}/(8+8\sqrt{2})$$

A pitch intensity is obtained with respect to the result $X(i, j)$ obtained after this emphasis processing. With this processing, when a large value is present adjacent to the point $(i, j)$, this value is weighted and added. The peak is therefore emphasized. In this case, the two-dimensional filter having a size of 3×3 is used. However, filters having various sizes can be used. In addition, a filter having a smoothing effect as well as a filter for emphasis processing can be used.

The third modification may be combined with the second modification using an cepstrum function to implement the fourth modification.

As has been described above, according to the present invention, feature vectors suited for an unspecific speaker speech recognition apparatus can be formed by using pitch intensity information exhibiting relatively small variations among individuals instead of frequency information exhibiting large variations among individuals and areas. At the same time, voiced sound/unvoiced sound segmentation errors can be reduced. High-precision speech recognition can therefore be realized.

With the use of the time derivatives of pitch intensities, the value increases at the boundary between a voiced sound and an unvoiced sound, or the boundary portion where a shift from an unvoiced sound to a voiced sound occurs. As a result, segmentation errors at these portions are reduced, and a further increase in precision can be attained.

What is claimed is:

1. A speech recognition apparatus comprising:

feature extraction means for extracting feature vectors of input speech, said feature extraction means including at least pitch intensity extraction means for extracting intensities of fundamental frequency components of the input speech; and recognition means for performing speech recognition by using the feature vectors from said feature extraction means.

2. An apparatus according to claim 1, wherein said feature extraction means includes at least pitch intensity time derivative extraction means for extracting time derivatives of the intensities of the fundamental frequency components of the input speech, and said recognition means performs speech recognition by using the feature vectors from said feature extraction means.

3. An apparatus according to claim 1, wherein the pitch intensity extracted by said pitch intensity extraction means is a maximum value among all quefrencies of a cepstrum or in a quefrency range defined in advance.

4. An apparatus according to claim 3, wherein said pitch intensity extraction means obtains a maximum value, as a pitch intensity, among all times of cepstrum coefficients or in a time range defined in advance after processing two-dimensional patterns in a frame direction and a quefrency direction by using a two-dimensional filter for peak emphasis.

5. An apparatus according to claim 1, wherein the pitch intensity extracted by said pitch intensity extraction means is one of a maximum value among all times of cepstrum coefficients or in a time range defined in advance and a logarithm thereof.

6. An apparatus according to claim 5, wherein said pitch intensity extraction means obtains a maximum value, as a pitch intensity, among all times of cepstrum coefficients or in a time range defined in advance after processing two-dimensional patterns in a frame direction and an cepstrum coefficient time direction by using a two-dimensional filter for peak emphasis.

7. A speech recognition apparatus comprising:

feature extraction means for extracting feature vectors of input speech, said feature extraction means including pitch intensity time derivative extraction means for extracting time derivatives of intensities of fundamental frequency components of the input speech; and recognition means for performing speech recognition by using the feature vectors from said feature extraction means.

8. An apparatus according to claim 7, wherein the pitch intensity used by said pitch intensity time derivative extraction means is a maximum value among all quefrencies of a cepstrum or in a quefrency range defined in advance.

9. An apparatus according to claim 8, wherein the maximum value among all the times of the cepstrum coefficients or in the time range defined in advance, which is used as the pitch intensity in said pitch intensity time derivative extraction means, is obtained after two-dimensional patterns in a frame direction and a quefrency direction are processed by a two-dimensional filter for peak emphasis.

10. An apparatus according to claim 7, wherein the pitch intensity used by said pitch intensity time derivative extraction means is one of a maximum value among all times of cepstrum coefficients or in a time range defined in advance and a logarithm thereof.

11. An apparatus according to claim 10, wherein the maximum value among all the times of the cepstrum coefficients or in the time range defined in advance, which is used as the pitch intensity in said pitch intensity time derivative extraction means, is obtained after two-dimensional patterns in a frame direction and an cepstrum coefficient time direction are processed by a two-dimensional filter for peach emphasis.

* * * * *